(12) United States Patent
Heidinger

(10) Patent No.: US 8,317,381 B2
(45) Date of Patent: Nov. 27, 2012

(54) VEHICLE LIGHT

(75) Inventor: Juergen Heidinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 5 days.

(21) Appl. No.: 12/487,749

(22) Filed: Jun. 19, 2009

(65) Prior Publication Data

US 2010/0014309 A1 Jan. 21, 2010

Related U.S. Application Data

(63) Continuation of application No. PCT/EP2007/010452, filed on Dec. 1, 2007.

(30) Foreign Application Priority Data

Dec. 22, 2006 (DE) .......................... 10 2006 062 272

(51) Int. Cl.
*G02B 6/00* (2006.01)

(52) U.S. Cl. .................... 362/551; 362/555; 362/558

(58) Field of Classification Search ............... 362/511, 362/516–518, 540–545, 555, 556, 558, 559, 362/605, 505–507, 509, 560, 606, 607, 619, 362/623–626; 385/31, 146
See application file for complete search history.

(56) References Cited

U.S. PATENT DOCUMENTS

| | | | | |
|---|---|---|---|---|
| 4,471,412 A * | 9/1984 | Mori | ............ | 362/556 |
| 5,966,192 A * | 10/1999 | Higuchi et al. | ............ | 349/61 |
| 6,104,854 A * | 8/2000 | Masaki et al. | ............ | 385/133 |
| 6,215,936 B1 * | 4/2001 | Yoshikawa et al. | ............ | 385/133 |
| 6,424,363 B1 | 7/2002 | Matsuba et al. | | |
| 6,827,458 B2 * | 12/2004 | Suga | ............ | 362/609 |
| 7,001,058 B2 * | 2/2006 | Inditsky | ............ | 362/610 |
| 7,093,968 B2 * | 8/2006 | Hsueh et al. | ............ | 362/606 |
| 7,195,389 B2 * | 3/2007 | Parker et al. | ............ | 362/606 |
| 7,360,939 B2 * | 4/2008 | Sugiura | ............ | 362/620 |
| 2002/0167820 A1 | 11/2002 | Haering et al. | | |
| 2004/0109105 A1 * | 6/2004 | Nagakubo et al. | ............ | 349/65 |
| 2004/0125589 A1 * | 7/2004 | Sung | ............ | 362/31 |
| 2005/0213341 A1 * | 9/2005 | Wehner | ............ | 362/545 |
| 2006/0044825 A1 * | 3/2006 | Sa | ............ | 362/600 |
| 2006/0067084 A1 | 3/2006 | Stefanov | | |
| 2006/0193144 A1 | 8/2006 | Braeutigam et al. | | |
| 2007/0121334 A1 * | 5/2007 | Bourdin et al. | ............ | 362/459 |
| 2007/0291510 A1 * | 12/2007 | Chen | ............ | 362/618 |

(Continued)

FOREIGN PATENT DOCUMENTS

DE 44 25 401 A1 2/1996

(Continued)

OTHER PUBLICATIONS

International Search Report dated Mar. 6, 2008, including English translation (four (4) pages).

(Continued)

*Primary Examiner* — Y My Quach Lee
(74) *Attorney, Agent, or Firm* — Crowell & Moring LLP

(57) ABSTRACT

A vehicle light is provided having a light source, a fiber-optic light guide into which light of the light source is coupled on a coupling surface, an expander for expanding the aperture angle of an incident light beam, and deflectors, which are intended for deflecting incident light, disposed behind a rear side of the fiber-optic light guide.

15 Claims, 3 Drawing Sheets

U.S. PATENT DOCUMENTS

| | | | |
|---|---|---|---|
| 2008/0158905 A1* | 7/2008 | Chuang et al. | 362/556 |
| 2008/0205205 A1 | 8/2008 | Chiang et al. | |
| 2009/0097275 A1* | 4/2009 | Sato | 362/623 |

FOREIGN PATENT DOCUMENTS

| | | |
|---|---|---|
| DE | 199 34 190 A1 | 3/2000 |
| DE | 198 31 002 A1 | 4/2000 |
| DE | 199 50 700 A1 | 4/2001 |
| DE | 100 29 542 A1 | 12/2001 |
| DE | 101 23 263 A1 | 11/2002 |
| DE | 203 06 739 U1 | 8/2003 |
| DE | 103 11 317 A1 | 9/2004 |
| DE | 103 43 639 A1 | 4/2005 |
| DE | 10 2004 030 725 A1 | 1/2006 |
| DE | 10 2004 046 386 A1 | 4/2006 |
| DE | 10 2006 052 663 A1 | 5/2008 |
| DE | 10 2007 046 714 A1 | 4/2009 |
| EP | 1 657 111 A2 | 5/2006 |
| EP | 1 775 511 A1 | 4/2007 |
| EP | 1 832 846 A1 | 9/2007 |
| EP | 1 988 363 A2 | 11/2008 |
| JP | 10-301929 A | 11/1998 |
| WO | WO 2007/021038 A1 | 2/2007 |

OTHER PUBLICATIONS

German Search Report dated Aug. 6, 2007, including English translation (nine (9) pages).
German Search Report dated Dec. 3, 2010 including partial English-language translation (Nine (9) pages).

* cited by examiner

VEHICLE LIGHT

CROSS-REFERENCE TO RELATED APPLICATIONS

This application is a continuation of PCT International Application No. PCT/EP2007/010452, filed Dec. 1, 2007, which claims priority under 35 U.S.C. §119 to German Patent Application No. DE 10 2006 062 272.3, filed Dec. 22, 2006, the entire disclosures of which are herein expressly incorporated by reference.

BACKGROUND AND SUMMARY OF THE INVENTION

The present invention relates to a vehicle light, in particular a taillight of a motor vehicle.

The focus of the ever fast-paced technological developments in the field of motor vehicle lighting systems is to provide additional flexibility to design departments of automobile manufacturers following new technical approaches. The aim is to provide vehicle lights, which are in sync with the design of the motor vehicle, or even form a distinctive feature thereof, while complying with statutory regulations and taking into account general economic and structural conditions.

Apart from having to meet design specifications of defined installation sizes and shapes, vehicle lights are also required to have a harmonious appearance taking into account statutory provisions regarding light functions and light distribution. However, it is difficult to bring about an agreement between function, structure and optical design in the case of taillights, in particular, where the least possible installation depth is additionally required in order to integrate the lights into the flat tailgate or rear region of the vehicle body.

Taillights known from the prior art use rod-shaped fiber-optic light guides, such as those described in DE 100 29 542 A1 by way of example, in which the required light is coupled into the ends of the fiber-optic light guide preferably by way of LEDs (light-emitting diodes). The largest portion of the coupled-in light is radiated outward perpendicular to the longitudinal direction of the fiber-optic light guide via a transparent light exit surface located opposite to a reflective surface. The reflective surface enables the creation of a radiation pattern, i.e., a defined light distribution such as the most uniform possible radiation over a defined surface, for example. This is achieved, for example, using a plurality of prism elements on the reflective surface. The prism elements can also, in operative interaction with an appropriately shaped light exit surface, additionally take on the function of a rear reflector (so-called retro reflector), which reflects the light striking on the vehicle light from the outside.

The disadvantage of this lighting technology known from the prior art is that although it does enable the provision of a vehicle light having relatively less installation depth as is required in the vehicle rear end, in particular, the prism structure is distinctly visible from the clear cover of the light. This prism structure can sometimes have a disturbing or particularly inhomogeneous effect on the visual impression of the light. Due to its transparency (on the light exit surface) and lower installation depth, the fiber-optic light guide additionally appears to be unfavorably two-dimensional in daylight and night designs, that is to say, in the off-state when the fiber-optic light guide is not illuminated and on-state when it is illuminated.

Furthermore, for example, DE 199 50 700 A1, DE 44 25 401 A1 and DE 103 43 639 A1 disclose vehicle lights, which operate using transmitted light technology and in which optical surface elements, such as lens units, prismatic panes or color screens, which are trans-illuminated by a light bulb and/or LED from behind via a reflector, are disposed at least in certain sections between a light source and a front window for achieving a defined light distribution or coloring.

The disadvantageous effect of this arrangement is that the lens units, prismatic panes or color screens and the reflectors have a rather asymmetrical effect on the overall impression of the light since they serve for creating a specified radiation pattern and are designed accordingly. In doing so, the optical design is sidelined, at best. Furthermore, the transmitted light technology using complex reflectors in combination with light bulbs and/or LEDs as light sources requires a relatively large installation space. These lights are therefore unsuitable for use as taillights in the flat tailgate or rear regions of the vehicle body.

It is the object of the present invention to provide a vehicle light, which has a homogeneous appearance while complying with statutory provisions regarding light distribution.

This object is achieved by a vehicle light having a light source and a fiber-optic light guide, into which the light of the light source is coupled on a coupling surface. Means are provided for expanding the aperture angle of an incident light beam, and for deflecting incident light, which means are disposed behind a rear side of the fiber-optic light guide. Preferred developments of the invention are described herein.

The invention is thus based on the idea of integrating expanding and deflecting devices into a vehicle light based on fiber-optic light guides in order to achieve a diffusely and homogeneously illuminating body, which can relatively efficiently meet the requirements regarding light distribution prescribed by law.

For this purpose, the vehicle light preferably includes at least one light source such as a light-emitting diode, and at least one fiber-optic light guide, which has a parallelepiped or rectangular cross-section and into which the light of the light source is coupled, particularly on at least one coupling surface.

Moreover, measures for expanding the aperture angle are provided particularly for scattering or reflecting, in a partly diffuse manner, a light beam or light reflex incident on the expanding devices. The means for expanding the aperture angle preferably cause the increased diffusion of the light striking on them and/or the attenuation of its preferred orientation.

Furthermore, deflecting devices are provided particularly for the directed reflecting of a light beam incident on the deflecting device, which are mounted on or integrated into a reflector device disposed behind a rear side of the fiber-optic light guide or are mounted on the rear side of the fiber-optic light guide or integrated into the fiber-optic light guide. The different deflectors each bring about a deflection of incident light or an incident light beam or a significant portion thereof.

The means for expanding the aperture angle of incident light cause the light guided in the fiber-optic light guide to become partly diffuse and to be coupled out of the fiber-optic light guide in a partly diffuse manner. The desired high-quality and homogeneous appearance of the fiber-optic light guide can thus be achieved for many viewing directions. However, laborious experiments have shown that such a fiber-optic light guide including only means for expanding the aperture angle of incident light is very inefficient, particularly when it comes to meeting statutory provisions regarding the overall radiated light distribution. It has also been observed that a simple reflector such as a reflective layer disposed behind the fiber-optic light guide does not sufficiently increase the efficiency of the latter.

The invention is based on the finding that light, which is expanded by expanders, guided in the fiber-optic light guide and coupled out is only partly diffuse. Due to the means for expanding the aperture angle of an incident light beam, the aperture angle of the light beam does indeed become larger, but it has or retains a defined preferred orientation. It has also been observed that light exits from the front and rear sides of the fiber-optic light guide at different coupling-out points and in different preferred orientations. The centroid direction or the average direction of the light beam directions that are weighted by the respective light intensity or the principal direction or direction of a light beam having maximum light intensity can be used as the preferred orientation of a light beam by way of example.

The present invention utilizes this finding by arranging the deflectors behind the rear side of the fiber-optic light guide to deflect the light coupled out of the rear side of the same in a directed fashion and depending on the different preferred orientations of the coupled-out light so that a relatively large portion of the light coupled out of the rear side of the fiber-optic light guide again enters into the fiber-optic light guide and exits from the front side of the fiber-optic light guide in defined preferred orientations. The defined preferred orientations can be selected depending on the statutory provisions regarding light distribution or light intensity distribution and taking into account the different preferred orientations of the light, which is already coupled out of the front side of the fiber-optic light guide without experiencing any deflection by the deflecting means.

The present invention thus increases the efficiency of a partly diffusely illuminating vehicle light taking into account statutory provisions regarding light distribution or light intensity distribution by the directed deflection of light, which is partly diffusely coupled out of the rear side of the fiber-optic light guide, taking into account and utilizing its different preferred orientations in such a way that this light, after being transmitted through the fiber-optic light guide, contributes significantly toward complying with statutory provisions regarding light distribution or light intensity distribution. In particular, the light, which is deflected by the deflectors and which finally exits from the front side of the fiber-optic light guide in different preferred orientations supplements the light, which is already coupled out of the front side of the fiber-optic light guide in different preferred orientations, in such a way that statutory provisions regarding light distribution or light intensity distribution can be complied with in an energy-efficient manner. For this purpose, the light coupled out of the rear side of the fiber-optic light guide can be deflected in a directed fashion and depending on the coupling-out points with the aid of suitable deflectors, which are adapted to the coupling-out points and/or the corresponding preferred orientation, so that light is substantially radiated in an identical overall preferred orientation out of the front side of the fiber-optic light guide at different points, particularly continuously on a predetermined radiating surface.

Partly diffuse light (light having a relatively large aperture angle, but one preferred orientation) is preferably coupled out of the front and rear sides of the fiber-optic light guide by expanding the light beam in the fiber-optic light guide. The light coupled out of the rear side is deflected with the aid of deflecting mechanisms that are separate from the fiber-optic light guide, and this light finally exits from the front side of the fiber-optic light guide together with the light coupled directly out of the front side of the fiber-optic light guide. The deflecting mechanisms are advantageously formed to enable the deflection of different light beams in such a way, taking into account the different preferred orientations of the light coupled out of the rear side of the fiber-optic light guide, that the different light beams finally after entry into the fiber-optic light guide and exit from the front side of the same together with the light beams coupled directly out of the front side of the fiber-optic light guide have a substantially identical overall preferred orientation at different coupling-points.

Aesthetically speaking, the radiation of partly diffuse light beams thus helps achieve a fiber-optic light guide, which illuminates sufficiently diffusely and efficiently complies with statutory provisions regarding light distribution due to the directed influence on the different preferred orientations of different partly diffuse light beams.

In principle, the invention also includes a vehicle light comprising deflectors that are integrated into the fiber-optic light guide and, for example, have a prism structure formed according to the invention. But its disadvantage is that the prism structure is visible through the rear side of the fiber-optic light guide particularly in the off-state of the vehicle light or the fiber-optic light guide. This visibility is also undesirable in a vehicle light for aesthetic reasons. Therefore, the deflector or the reflector device is preferably formed separately from the fiber-optic light guide or the deflector or the reflector device is not an integral part of the fiber-optic light guide. In particular, the deflectors have no direct contact with the fiber-optic light guide. As a result, the vehicle light, or the fiber-optic light guide in particular, has a homogeneous appearance in the on- and off-states. Particularly when the vehicle light is switched off, this homogeneous appearance is not affected significantly by the transparent contours of the deflector. Due to the arrangement of the deflector behind the fiber-optic light guide or separately from the fiber-optic light guide, the deflector only deflects the coupled-out light and does not influence the light guided in the fiber-optic light guide. This arrangement also has efficiency advantages since, although a deflection of light by the deflector may involve the absorption of light, the external deflector does not absorb the light guided in the fiber-optic light guide.

The invention naturally also includes vehicle lights including a fiber-optic light guide, which radiates light not only from its front side but also from other surfaces, particularly its upper and lower sides. The fiber-optic light guide thus resembles a glowing three-dimensional body or a light cube. Several such light cubes can also be used next to each other in a vehicle light. In particular, the contour of the front side of the fiber-optic light guide and the three-dimensional shape of the fiber-optic light guide, which can be a straight or "curved" rectangular parallelepiped, for example, can be selected relatively freely in terms of design.

The device for deflecting the light particularly preferably includes a facet structure, particularly a facet structure disposed on a reflector device, or a facet structure integrated into a reflector device, a facetted mirror, a stepped mirror or a stepped reflector.

Devices for expanding the light are preferably implemented with the aid of scattering elements (volume scattering elements) integrated into the fiber-optic light guide and/or provision of a rough texture to at least one surface of the fiber-optic light guide. When using volume scattering elements, the expansion of the aperture angle ("subjecting the light to diffusion") is based on volume effects, whereas the expansion of the aperture angle by means of roughness, or partly diffuse reflection in particular, is based on surface effects. Particularly in the case of deflectors provided outside the fiber-optic light guide, the expanders are preferably an integral part of the fiber-optic light guide. At least the front, upper, lower and/or rear sides of the fiber-optic light guide are preferably roughened up or grained in order to expand the aperture angle of the light beams striking on them and thus subject to diffusion the light guided in the fiber-optic light guide (with total reflection) and the light finally coupled-out.

The expanders are advantageously formed in such a way that light, or the partly diffuse light beams each having a preferred orientation, is coupled out of the front side of the fiber-optic light guide at different front-coupling-out points in different preferred orientations and light, or partly diffuse light beams each having a preferred orientation, is coupled out of the rear side of the fiber-optic light guide at different rear-coupling-out points in different preferred orientations. The devices for expanding the aperture angle thus also cause that light to be partly coupled out of the fiber-optic light guide that would have largely been guided in the fiber-optic light guide based on the total reflection without devices for expanding the aperture angle. The different coupling-out points are illustrated by way of example for different sections of the coupling-out front or rear sides of the fiber-optic light guide. The coupled-out light can constantly or discontinuously, continuously or discretely, change its intensity, or luminance, in particular, or its preferred orientation along the coupling-out surface (front or rear sides) without taking into account the influence of the deflectors.

In one design version of the invention, the fiber-optic light guide can be almost non-transparent in its off-state with the aid of the expanding device. Objects disposed behind the fiber-optic light guide such as deflecting or mounting devices can then be provided with less design effort. This enables the provision of an easily and cost-effectively producible light of high-quality design.

The deflectors are advantageously formed in such a way behind the rear side of the fiber-optic light guide that light deflected by the deflector again enters from the rear side of the fiber-optic light guide and exits from the front side of the same at different exit points in different preferred orientations (the terms "couple-in" and "couple-out" are not used in this connection within the scope of the invention). That is to say, the deflected light is transmitted through the fiber-optic light guide. The light coupled-out of the rear side can thus also be used for complying with statutory provisions regarding light distribution and can contribute toward creating a homogeneous appearance of the vehicle light.

The deflectors and/or expanders are preferably formed in such a way that all the light, which exits from the front side of the fiber-optic light guide (and is deflected by the deflectors), and/or the coupled-out light brings about a specified light distribution or light intensity distribution, particularly by virtue of the fact that the light, which exits from the front side of the fiber-optic light guide (and is deflected by the deflectors), and/or coupled-out light substantially has the same overall preferred orientation at different points or at all points of a predetermined radiating surface.

The deflectors and/or expanders are preferably formed in such a way that light that is deflected by the deflector and that exits from the front side at different exit points together with the light coupled out of the front side at different front-coupling-out points brings about a specified light distribution or light intensity distribution and/or substantially has an identical overall preferred orientation at different exit points or front-coupling-out points. In the case of a vehicle taillight, in particular, the deflecting and expanding devices are formed in such a way that the overall preferred orientation is located parallel to the longitudinal axis of the vehicle since the specified light distribution or light intensity distribution to be complied with frequently prescribes the maximum light intensity for this orientation.

In order to ensure not only a substantially uniform overall preferred orientation of the coupled-out light within a predetermined radiating surface, which can also be part of an overall radiating surface, but also uniform luminance, it is suggested to form the deflectors in such a way that the deflectors located closer to the light source bring about a less efficient deflection of incident light than deflectors located farther from the light source. Alternatively or additionally thereto, the expanding and thus coupling-out means are formed in such a way that the expanders located closer to the light source bring about a less efficient coupling-out of the incident light than expanders located farther from the light source. For example, the concentration or dimensions of the volume scattering elements located closer to the light source can be smaller or the degree of roughness of surfaces located closer to the light source can be lesser or the rough surfaces located closer to the light source can be smaller.

A vehicle taillight is particularly practical if it additionally includes a transparent cover. While the expanders homogenize the appearance of the light for different viewing directions, the three-dimensional fiber-optic light guides disposed behind the transparent cover then give the impression of spatial depth.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
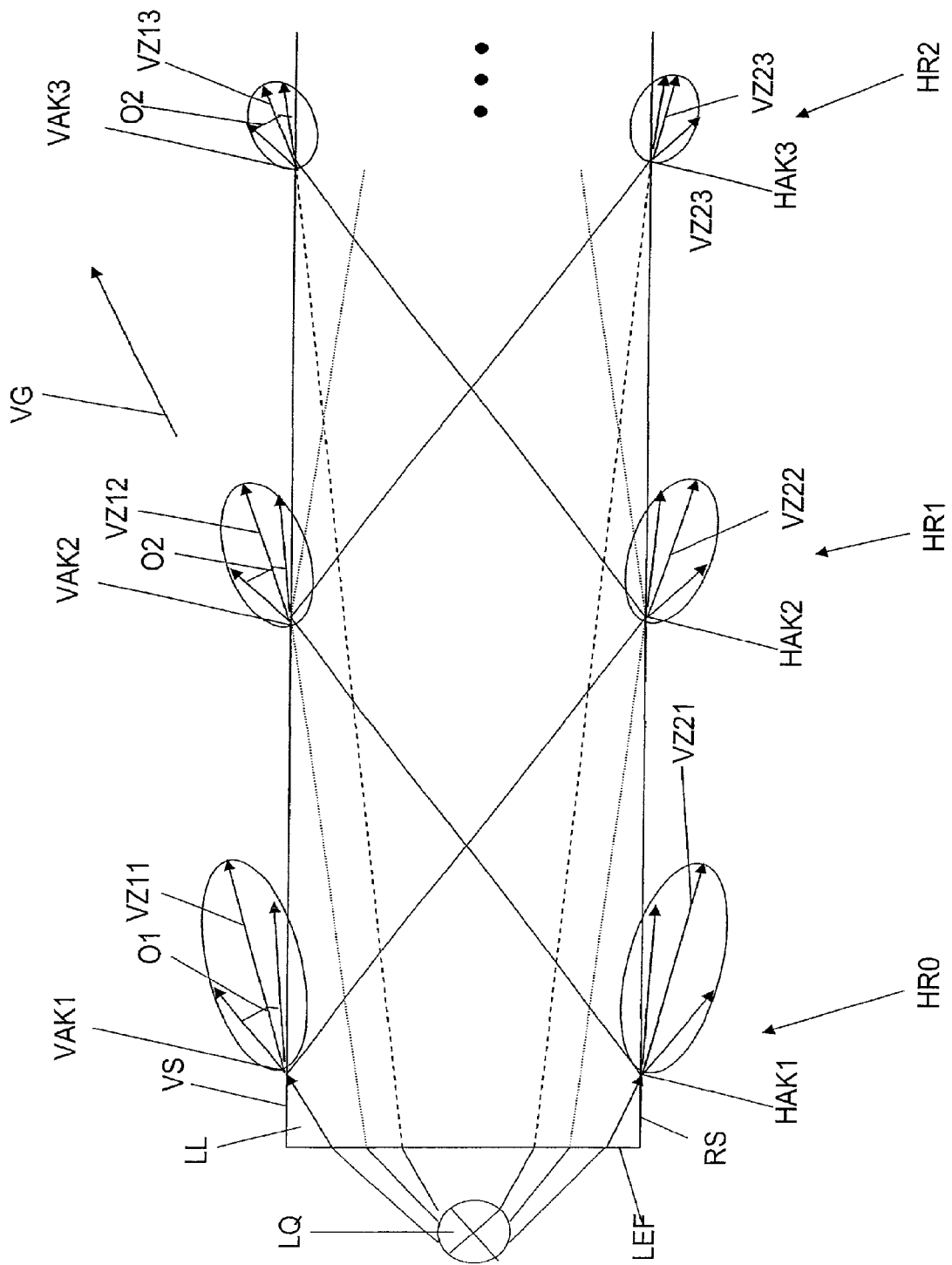
FIG. 1 shows a basic sectional representation of a fiber-optic light guide.

FIG. 1 shows a longitudinal section of a fiber-optic light guide LL, which has a parallelepiped shape and is part of a vehicle light. Light from a light source LQ is coupled into the fiber-optic light guide LL on a coupling surface LEF. The coupled-in light is basically guided in the fiber-optic light guide LL along the longitudinal direction of the same, but is coupled-out of the fiber-optic light guide LL at points where the conditions for creating total reflection are not met.

Expanding devices such as volume scattering elements VSE in the fiber-optic light guide LL or roughness RSS of one or more surfaces of the fiber-optic light guide LL increase the aperture angle of the incident light beam. These exemplary expanding devices are illustrated schematically in FIG. 3 for clarity. A large part of the light, which is originally coupled-in from the lateral coupling surface LEF, thus no longer meets the conditions for creating a total reflection on a boundary surface of the fiber-optic light guide LL. Light is thus coupled out of different points of the fiber-optic light guide LL (or continuously along the fiber-optic light guide LL). In particular, light is coupled out of the front VS and rear sides RS of the fiber-optic light guide LL.

FIG. 1 shows, by way of example, three coupling-out events, respectively, for the front VS and rear sides RS of the fiber-optic light guide LL, each of these events representing the main reflex 0 (HR0), the 1st main reflex (HR1) and the 2nd main reflex (HR2).

Main reflex 0 HR0 describes the first reflection of the coupled-in, unscattered light on the corresponding boundary surface or on the front VS or rear side RS of the fiber-optic light guide LL, which first reflection is located closest to the coupling surface LEF.

However, due to the expanding devices such as the volume scattering elements VSE and/or the roughened surfaces RSS, it is not merely one coupled-in light ray but a ray beam having a preferred orientation and an aperture angle that strikes on the corresponding points VAK1, HAK1 of main reflex 0 HR0 of the front VS and rear side RS of the fiber-optic light guide LL. That part of the ray beam that does not meet the conditions for creating a total reflection at points VAK1, HAK1 is coupled out of the fiber-optic light guide LL at points VAK1, HAK1 in the form of a ray bundle in a preferred orientation VZ11, VZ21 and an aperture angle O1. Here, the aperture angle can be defined variably depending on the design version of the invention. The larger the aperture angle, the more diffuse is the corresponding light beam or the brighter is the corresponding distribution of light intensity. It is also possible, for example, for light, the intensity of which is below a threshold value, to be radiated outside the aperture angle.

Points VAK1, HAK1 of main reflex 0 HR0 on the front VS and rear side RS of the fiber-optic light guide LL are also determined by the aperture angle of the light beam radiated from the light source LQ.

The 1st main reflex HR1 describes the second reflection of the coupled-in, unscattered light on that boundary surface or rear RS or front side VS of the fiber-optic light guide LL that is located opposite to the first reflection, which second reflection is located closest to the coupling surface LEF. Here also, a light beam having a preferred orientation VZ12, VZ22 and an aperture angle O2 is coupled out of the front VS or rear side RS of the fiber-optic light guide LL at the corresponding point VAK2, HAK2 of the 1st main reflex HR1.

The 2nd main reflex HR2 describes the third reflection of the coupled-in, unscattered light on that boundary surface or front VS or rear side RS of the fiber-optic light guide LL that is located opposite to the second reflection, which third reflection is located closest to the coupling surface LEF. Here also, a light beam having a preferred orientation VZ13, VZ23 and an aperture angle O3 is coupled out of the front VS or rear side RS of the fiber-optic light guide LL at the corresponding point VAK3, HAK3 of the 2nd main reflex HR2.

Naturally, light is also coupled out of the fiber-optic light guide between the points of the main reflexes and following the 3 aforementioned main reflexes. This is not illustrated merely for the sake of clarity.

Furthermore, it must be mentioned at this point that the Figures, in particular the illustration of the lengths and directions of the arrows and the aperture angles, are merely intended to improve the understanding of the principle and design version of the present invention, but they do not correspond to reality, particularly in quantitative respects.

In effect, in the fiber-optic light guide LL shown in FIG. 1, light is coupled-out of the front VS and rear side RS at different points VAK1, VAK2, VAK3, HAK1, HAK2, HAK3 in different preferred orientations VZ11, VZ12, VZ13, VZ21, VZ22, VZ23. The light coupled-out of the front side VS can contribute toward achieving the specified light intensity distribution, but not the light coupled out of the rear side RS. However, achieving the specified light intensity distribution with the help of the light coupled out of the front side VS is at best possible with very high coupled-in luminous fluxes because all the light coupled-out of the front side VS has a preferred orientation VG pointing away from the light source LQ since it is coupled-in from a lateral coupling surface LEF. So, if such a fiber-optic light guide were integrated into a vehicle taillight, it would illuminate the edge of the road rather than the area located behind the vehicle. Moreover, such a vehicle taillight would not have an evenly homogeneous appearance.

An undesirable coupling-out of light from the rear side RS of the fiber-optic light guide LL could be prevented or canceled out with the aid of a reflective surface disposed on or behind the rear side RS of the fiber-optic light guide LL so that this light could finally also be coupled-out of the front side VS. The light coupled out of the front side VS in this manner would still have a preferred orientation pointing away from the light source LQ similar to that of the light coupled directly out of the front side. Therefore, the implementation of a homogenously and diffusely illuminating body with the aid of such an easily reflecting rear side, while simultaneously achieving the specified light intensity distribution, is only possible in a relatively inefficient way.

Figure 2:
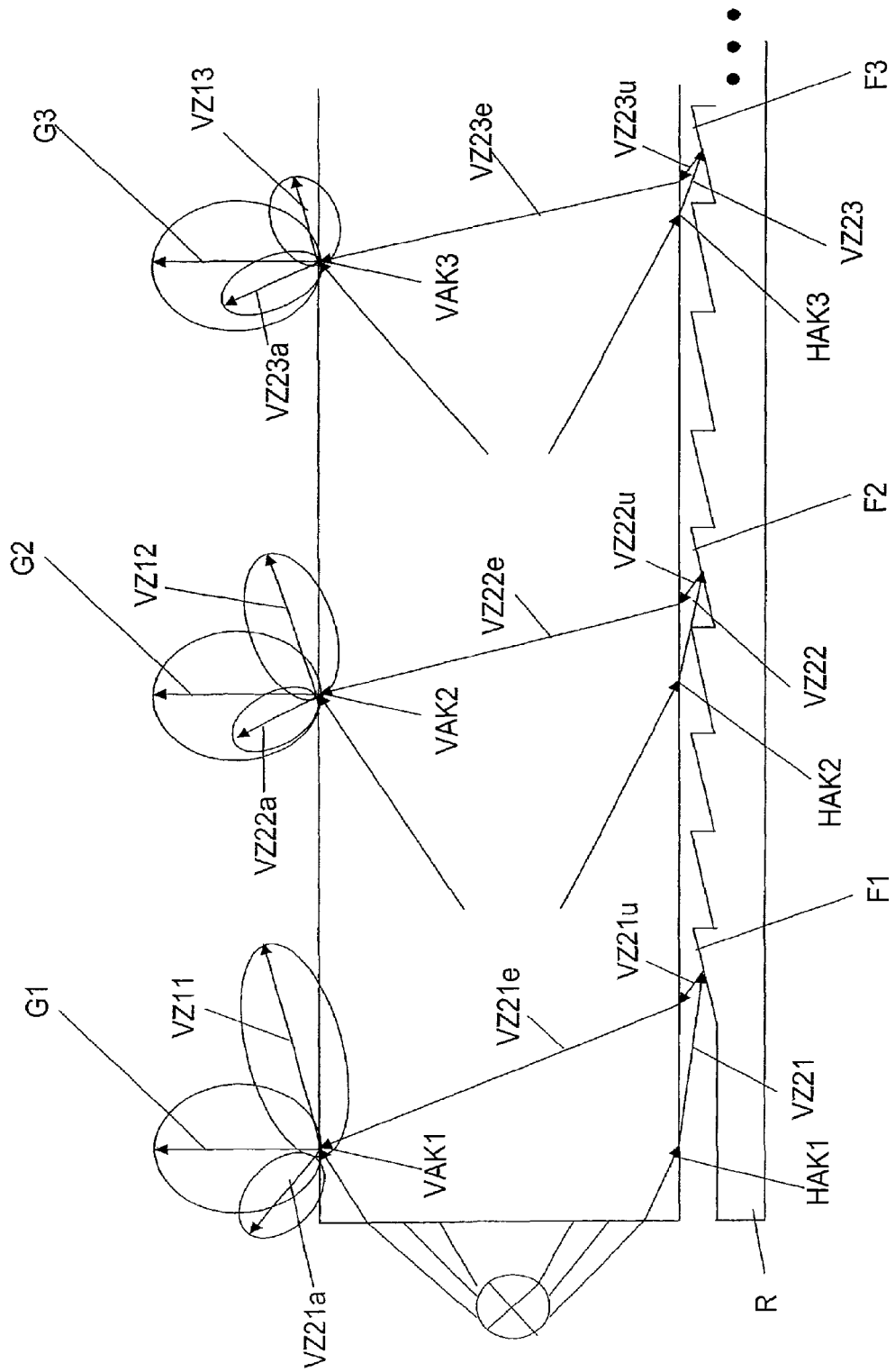
FIG. 2 shows a basic sectional representation of a fiber-optic light guide together with a reflector device.
Figure 3:
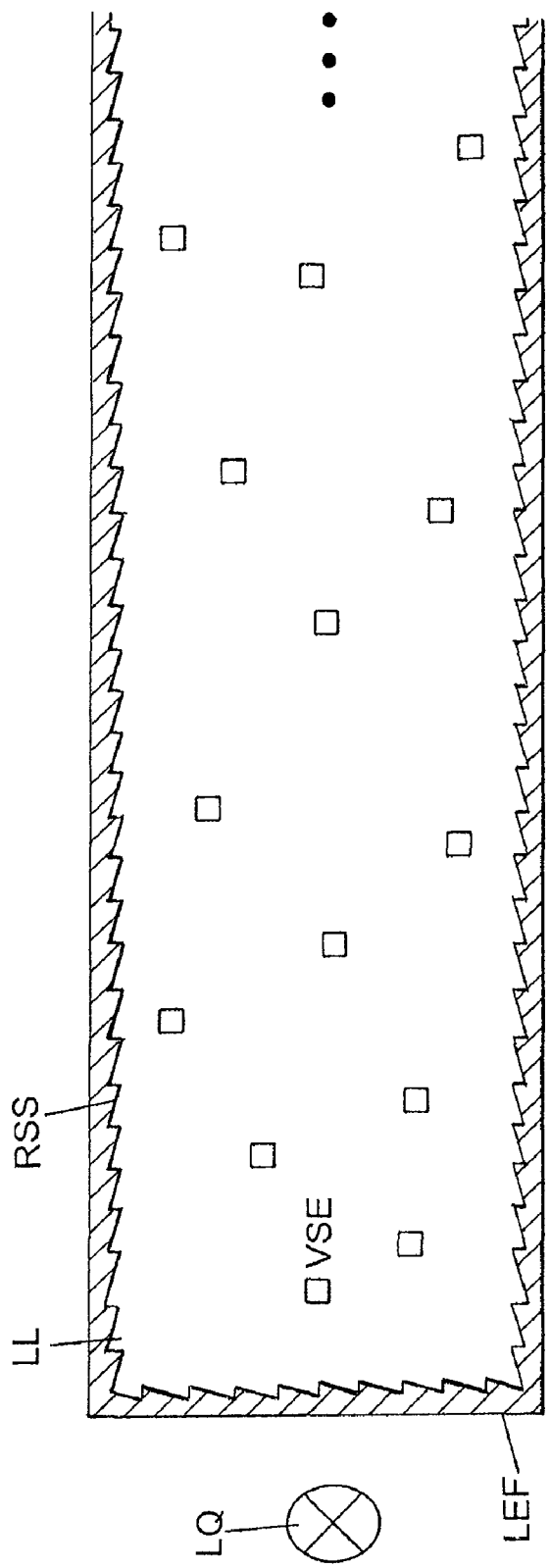
FIG. 3 shows exemplary expanding devices within the fiber-optic light guide.

FIG. 2 shows the fiber-optic light guide LL of FIG. 1 including a reflector unit R disposed behind the rear side RS, together with facets F1, F2, F3, which extend transversely to the longitudinal direction of the fiber-optic light guide LL and serve to deflect the light coupled out of the rear side RS. Exemplary embodiments of the expanders formed in the fiber-optic light guide LL are illustrated in FIG. 3.

The deflectors F1, F2, F3 are formed in such a way, depending on their locations and with adaptation to the light beams incident on them (and particularly the preferred orientation of a light beam incident on them) that all the light exiting from and/or coupled out of the front side VS of the fiber-optic light guide LL substantially has the same overall preferred orientation G1, G2, G3 at different points on the front side VS.

The light coupled-out of the rear side RS at the different rear-coupling-out points HAK1, HAK2, HAK2 in corresponding different preferred orientations VZ21, VZ22, VZ23 is deflected by the variably inclined reflecting surfaces of F1, F2, F3 in different preferred orientations VZ21$u$, VZ22$u$, VZ23$u$.

The light or light beams deflected in this way each again enter into the fiber-optic light guide LL and strike on the front side VS of the fiber-optic light guide LL from different preferred orientations VZ21$e$, VZ22$e$, VZ23$e$ after undergoing diffraction at the rear side RS. The light or light beams deflected by the deflectors F1, F2, F3 finally exit from the front side of the fiber-optic light guide LL, each in different preferred orientations VZ21$a$, VZ22$a$, VZ23$a$.

The light beams exiting in this way (in different preferred orientations VZ21$a$, VZ22$a$, VZ23$a$) each form together with the light beams (with different preferred orientations VZ11, VZ12, VZ13) coupled-out of the same point on the front side VS directly (without having experienced any deflection by the deflectors) an overall light beam having an overall preferred orientation G1, G2, G3 and a relatively broad aperture angle. The preferred orientations VZ21$a$, VZ22$a$, VZ23$a$ and thus the overall preferred orientations G1, G2, G3 are selectively influenced by the different designs or inclinations or slopes of the deflectors F1, F2, F3.

In particular, the deflectors F1, F2, F3 are formed in such a way that light, which is deflected by the deflectors and which exits from the front side VS at different exit points together with the light coupled out of the front side at different front-coupling-out points VAK1, VAK2, VAK3 substantially has an identical overall preferred orientation G1, G2, G3 at different exit points or front-coupling-out points, and this overall preferred orientation is located parallel to the longitudinal axis of the vehicle. The specified light intensity distribution for vehicle taillights can thus be achieved in a particularly efficient manner with the aid of a diffusely illuminating fiber-optic light guide.

In doing so, it is particularly advantageous, but by no means necessary, for the light beam coupled out of the rear side RS at the nth main reflex to exit together with the light coupled out at the nth main reflex directly (without deflection) at the same point following deflection and transmission through the fiber-optic light guide. This enables a more homogeneous luminous effect of the fiber-optic light guide that extends up to sharp outer boundaries.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle light comprising:
   a light source;
   a fiber-optic light guide comprising:
      a front side and a rear side;
      a coupling surface through which light from the light source is coupled-in to the fiber-optic light guide; and
      an expander for expanding an aperture angle of an incident light beam; and
   a reflector comprising a plurality of deflectors for deflecting incident light, wherein:
   the reflector is disposed behind the rear side of the fiber-optic light guide, and is spaced apart from the rear side of the fiber-optic light guide;
   the reflector is formed entirely as a facet structure having only substantially planar surfaces; and
   the reflector is formed such that incident light from the fiber-optic light guide, which is deflected by the reflector and re-enters the fiber-optic light guide, exits from the front side of the fiber-optic light guide at different exit points in different preferred orientations.

2. The vehicle light according to claim 1, wherein the expander comprises at least one of scattering elements in the fiber-optic light guide and a rough texture applied to at least one surface of the fiber-optic light guide.

3. The vehicle light according to claim 2, wherein:
   the expander is formed such that light is coupled out of the front side of the fiber-optic light guide at different front-coupling-out points, and light is coupled out of the rear side of the fiber-optic light guide at different rear-coupling-out points;
   the light coupled out of the front side of the fiber-optic light guide has different preferred orientations depending on a distance between the coupling surface and the front-coupling-out point; and
   the light coupled out of the rear side of the fiber-optic light guide has different preferred orientations depending on a distance between the coupling surface and the rear-coupling-out point.

4. The vehicle light according to claim 1, wherein:
   the expander is formed such that light is coupled out of the front side of the fiber-optic light guide at different front-coupling-out points, and light is coupled out of the rear side of the fiber-optic light guide at different rear-coupling-out points;
   the light coupled out of the front side of the fiber-optic light guide has different preferred orientations depending on a distance between the coupling surface and the front-coupling-out point; and
   the light coupled out of the rear side of the fiber-optic light guide has different preferred orientations depending on a distance between the coupling surface and the rear-coupling-out point.

5. The vehicle light according to claim 4, wherein the reflector is formed such that all light exiting from and/or coupled out of the front side of the fiber-optic light guide substantially has an identical overall preferred orientation at different points on the front side.

6. The vehicle light according to claim 4, wherein the reflector is formed such that the light that is deflected by the reflector, re-enters the fiber-optic light guide, and exits from the front side at different exit points, combines with the light coupled out of the front side at different front-coupling-out points, wherein each of the exit points corresponds to a respective front-coupling-out point, to form outgoing light with an identical overall preferred orientation at the different front-coupling-out points.

7. The vehicle light according to claim 1, wherein the reflector is formed such that all light exiting from and/or coupled out of the front side of the fiber-optic light guide substantially has an identical overall preferred orientation at different points on the front side.

8. The vehicle light according to claim 7, wherein the overall preferred orientation is located parallel to a longitudinal axis of the vehicle.

9. The vehicle light according to claim 1, wherein the reflector is formed such that the light that is deflected by the reflector, re-enters the fiber-optic light guide, and exits from the front side at different exit points combines with light coupled out of the front side at different front-coupling-out points, wherein each of the exit points corresponds to a respective front-coupling-out point, to form outgoing light with an identical overall preferred orientation at the different front-coupling-out points.

10. The vehicle light according to claim 9, wherein the overall preferred orientation is located parallel to a longitudinal axis of the vehicle.

11. The vehicle light according to claim 1, wherein the reflector is formed such that a first portion of the reflector brings about a less efficient deflection of incident light than a second portion of the reflector located farther from the light source than the first portion of the deflector.

12. The vehicle light according to claim 1, wherein the expander is formed such that a first portion of the expander brings about a less efficient coupling out of incident light than a second portion of the expander located farther from the light source than the first portion of the expander.

13. The vehicle light according to claim 12, wherein:
   the expander comprises at least one of scattering elements in the fiber-optic light guide and a rough texture applied to at least one surface of the fiber-optic light guide, and
   at least one of:
      a concentration of scattering elements in the first portion is smaller than a concentration of scattering elements in the second portion,
      a size of scattering elements in the first portion is smaller than a size of scattering elements in the second portion,
      a degree of roughness of rough textures in the first portion is less than a degree of roughness of rough textures in the second portion, or
      a size of rough textures in the first portion is less than a size of rough textures in the second portion.

14. The vehicle light according to claim 1, wherein the expander comprises scattering elements in the fiber-optic light guide.

15. A vehicle light comprising:
a light source;
a fiber-optic light guide comprising:
  a front side and a rear side;
  a coupling surface through which light from the light source is coupled-in to the fiber-optic light guide; and
  an expander for expanding an aperture angle of an incident light beam; and
a reflector comprising a plurality of deflectors for deflecting incident light, wherein:
the reflector is disposed behind the rear side of the fiber-optic light guide, and is spaced apart from the rear side of the fiber-optic light guide;
the reflector is formed entirely as a facet structure having only substantially planar surfaces; and
the reflector is formed such that light that is deflected by the reflector, re-enters the fiber-optic light guide, and exits from the front side at different exit points combines with light coupled out of the front side at different front-coupling-out points, wherein each of the exit points corresponds to a respective front-coupling-out point, to form outgoing light with an identical overall preferred orientation at the different front-coupling-out points.

* * * * *